United States Patent
Neal et al.

(10) Patent No.: US 9,087,321 B2
(45) Date of Patent: Jul. 21, 2015

(54) POLL-BASED NETWORKING SYSTEM

(75) Inventors: David Shaun Neal, Tuxedo, NY (US); Timothy Beggy, Pittsburgh, PA (US)

(73) Assignee: TRINITY INTEL MEDIA, LLC, Pittsburgh, PA (US)

( * ) Notice: Subject to any disclaimer, the term of this patent is extended or adjusted under 35 U.S.C. 154(b) by 1009 days.

(21) Appl. No.: 12/951,332

(22) Filed: Nov. 22, 2010

(65) Prior Publication Data

US 2011/0214068 A1    Sep. 1, 2011

Related U.S. Application Data

(60) Provisional application No. 61/309,038, filed on Mar. 1, 2010.

(51) Int. Cl.
*G06F 3/01* (2006.01)
*G06Q 10/10* (2012.01)
*G06F 17/30* (2006.01)

(52) U.S. Cl.
CPC ........ *G06Q 10/10* (2013.01); *G06F 3/01* (2013.01); *G06F 17/30* (2013.01)

(58) Field of Classification Search
CPC .................................. G06F 17/30; G06F 3/01
USPC .......................................... 715/744, 751
See application file for complete search history.

(56) References Cited

U.S. PATENT DOCUMENTS

2009/0287763 A1* 11/2009 Svendsen et al. ............. 709/203
2012/0296749 A1* 11/2012 Zuckerberg et al. ....... 705/14.71

* cited by examiner

*Primary Examiner* — Andrea Leggett
(74) *Attorney, Agent, or Firm* — Risso & Associates

(57) ABSTRACT

Described is a poll-based networking system. The system provides an on-line network of friends that are determined through polling each of the users. This system polls a user with a variety of questions. After providing an answer to each question, the system compares, in real-time, the current user's responses with all other users' responses to identify those users that most similarly answered the questions to that of the current user. As the current user progressively answers additional questions, the system progressively updates the matching and presentation of similar users. As such, as the current user navigates the website by answering polling questions, the selected answers are compared against the selected answers of other users to generate a likelihood of match between the user and each of the other users. The user profiles of other users that have a likelihood of match within a predetermined threshold are then presented.

27 Claims, 9 Drawing Sheets

POLL-BASED NETWORKING SYSTEM

PRIORITY CLAIM

The present application is a non-provisional patent application of U.S. Provisional Application No. 61/309,038, filed on Mar. 1, 2010, entitled, "Poll-Based Networking System."

FIELD OF INVENTION

The present invention relates to a networking system and, more particularly, to a networking system that connects users based on similarities as determined through poll answering and provides real-time results to the users.

BACKGROUND OF INVENTION

With the advent of the interne, a plethora of social networking websites have been established. By way of example, MySpace® and Facebook® are internet-based networking sites that allow users to create and participate in social networks. Such social networking sites share several common characteristics in that they allow users to create profiles, find friends to create friend groups, and share information with individuals in their friend groups.

In finding friends or creating friend groups, existing sites allow users to search various fields or categories. For example, Facebook® allows users to search through a user database to identify individuals that went to a common high school or university. Alternatively, such sites may ask what high school the user went to and provides suggested friends who also attended the same high school. In providing such a question, the site is querying or polling the user to match the user with other similar users.

While the sites may query the user to classify the user with a similar group of people, such sites do not provide a progressive poll query that, in real-time, matches the user with other users based upon all of the polls taken. In other words, existing sites maintain a database with user profiles. When a new user registers on an existing site, the site may attempt to match the user profile with existing user profiles as stored on a database. While such existing sites match a collective user profile against predefined categories, they do not progressively poll and match the user against all other users after each query item.

Thus, a continuing need exists for a poll-based networking system that includes matching logic that is operable for matching, in real-time, a user with other users based upon all of the polls taken by the user and other users.

SUMMARY OF INVENTION

The present invention is directed to a poll-based networking system that connects users based on similarities as determined through poll answering and provides real-time results to the users. While considering the failure of others to make use of all of the above components in this technology space, the inventors unexpectedly realized that using a plurality of match servers would allow the system to quickly connect the users based on their similarities.

Thus, the present invention includes a data processing system having one or more processors and a memory. The memory is specifically encoded with instructions such that when executed, the instructions cause the one or more processors to perform operations of:

receiving user information from a user to generate a unique user profile for the user;

providing the user a first polling question, the first polling question having a finite set of answers and a unique identification;

receiving and storing a selected answer for the first polling question;

comparing the selected answer against the selected answers of other users, based on the unique identification, to generate a likelihood of match between the user and each of the other users; and displaying to the user the user profiles of other users that have a likelihood of match within a predetermined threshold.

Additionally, the one or more processors are further configured to perform operations of:

providing the user with a next polling question, the next polling question having a finite set of answers and a unique identification;

receiving and storing a selected answer for the next polling question;

cumulatively comparing the selected answer for the first polling question and the next polling question against the selected answers of other users to generate a likelihood of match between the user and each of the other users;

displaying to the user the user profiles of other users that have a likelihood of match within a predetermined threshold; and repeating the process for a plurality of next polling questions.

In cumulatively comparing, the one or more processors are further configured to perform operations of:

matching the user to other users based upon all of the selected answers by the user and all of the selected answers by the other users, such that all of the selected answers by the user are compared to all of the selected answers of all of the other users; and generating a likelihood of mach between the user and each of the other users as a match percentage.

Additionally, in generating a likelihood of match between the user and each of the other users as a match percentage, the one or more processors are further configured to perform operations of:

determining a total number of polling questions as taken by the user and a selected other user;

determining a number of same selected answers between the user and the selected other user; and dividing the number of same selected answers by the total number of polling questions to generate the mach percentage between the user and the selected other user.

The system is also operable for performing operations of:

receiving match commands to identify users that fall within a maximum and minimum match percentage between the user and other users; and displaying to the user a maximum number of members that fall within the maximum and minimum match percentage.

In another aspect, the one or more processors are also configured to perform operations of:

collecting the selected answers with a web server and storing the selected answers in a database;

upon receipt of a selected answer, separately transmitting the selected answer from the web server, through a match aggregator, to a plurality of match servers, each match server being assigned a distinct subset of the other users, such that each match server compares the selected answer of the user against the selected answers of the users in its distinct subset to generate a likelihood of match between the user and each of the users in its distinct subset;

receiving in the match aggregator, from each match server, a likelihood of match between the user and the users in the distinct subset;

compiling the likelihood of matches from the plurality of match servers to generate the likelihood of match between the user and each of the other users; and transmitting the likelihood of match between the user and each of the other users to the web server for further processing.

Finally, the present invention also includes a computer implemented method and a corresponding computer program product. The method comprises an act of causing a computer having one or more processors and a memory specifically encoded with computer executable instruction means to execute the instruction means to cause the one or more processors to perform the operations described herein, while the computer program product comprises computer-readable instruction means stored on a non-transitory computer-readable medium that are executable by a computer for causing the computer to perform said operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
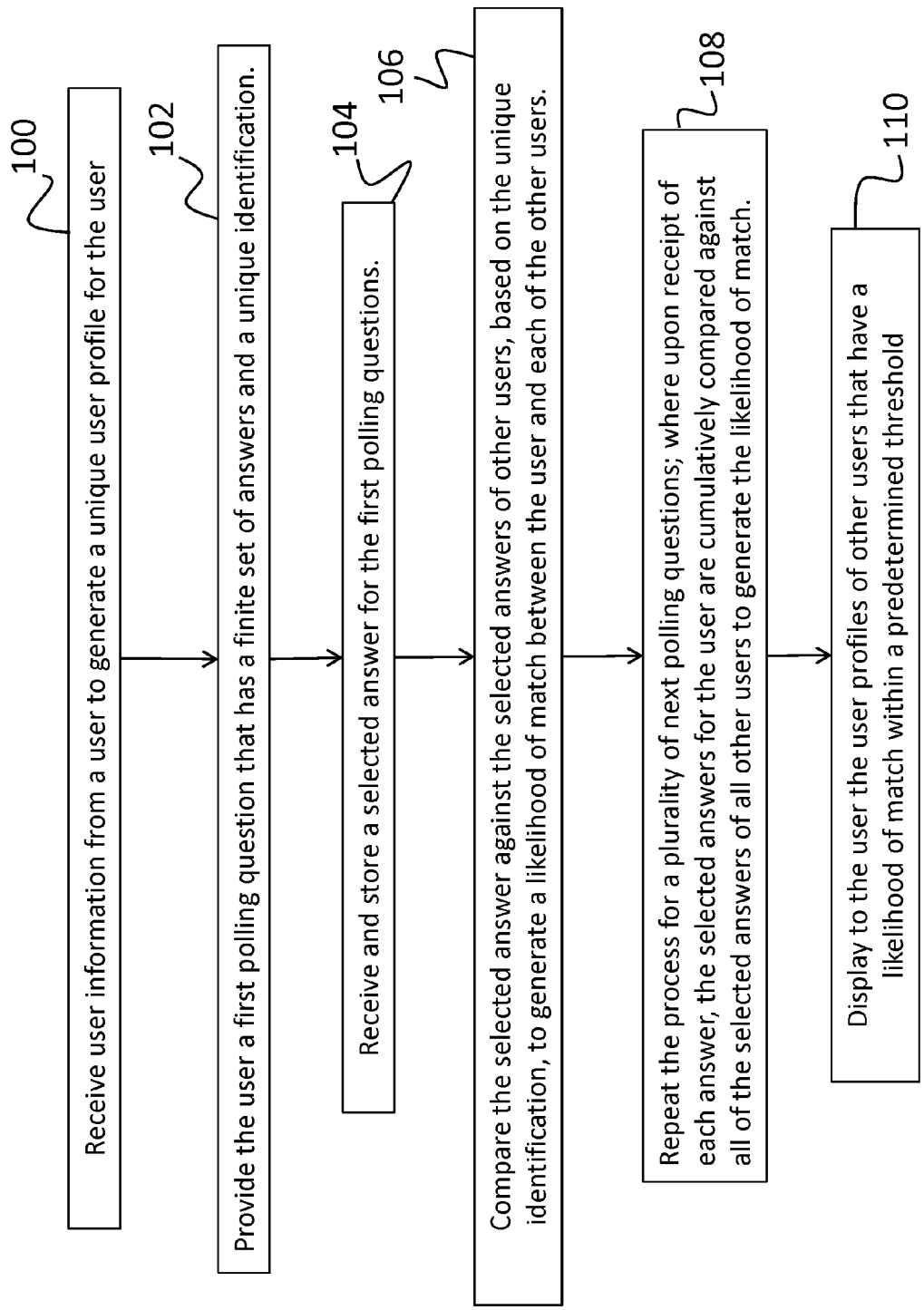
FIG. 1 is a flow chart depicting a process for poll-based networking according to the present invention.

The present invention relates to a networking system and, more particularly, to a networking system that connects users based on similarities as determined through poll answering and provides real-time results to the users. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Next, details of the present invention are provided to give an understanding of the specific aspects. Finally, a conclusion is presented.

(1) GLOSSARY

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Alternative—The term "alternative" as used with respect to this invention generally indicates an embodiment that is not equivalent to another embodiment.

Embodiment—The term "embodiment" means an embodiment that serves to illustrate by way of example but not limitation.

Instruction Means—The term "instruction means" or "instructions" as used with respect to this invention generally indicates a set of operations to be performed on a computer, and may represent pieces of a whole program or individual, separable, software modules. Non-limiting examples of "instruction means" or "instructions" include computer program code (source or object code) and "hard-coded" electronics (i.e. computer operations coded into a computer chip). The "instruction means" (or instructions) may be stored in the memory of a computer or on a non-transitory computer-readable medium such as a floppy disk, a CD-ROM, and a flash drive (or any other non-transitory computer readable medium).

Polling Question—The term "polling question" as used with respect to this invention generally indicates a question that has multiple answers. The polling question is presented to the user for selection of one of the answers.

(2) PRINCIPAL ASPECTS

The present invention has three "principal" aspects. The first is poll-based networking system. The networking system is typically in the form of a computer system having one or more data processors operating software or in the form of a "hard-coded" instruction set. This system may be incorporated into a wide variety of devices that provide different functionalities. The second principal aspect is a computer implemented method, typically in the form of software, operated using a data processing system (computer or computers). The third principal aspect is a computer program product. The computer program product generally represents computer-readable instruction means stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(3) INTRODUCTION

The present invention relates to a poll-based networking system. The system provides an on-line network of friends or affiliations that are determined through polling each of the users. As an improvement over the prior art, the present invention polls a user with a variety of questions. After providing an answer to each question, the system compares, in real-time, the current user's responses with all other users' responses to identify those users that most similarly answered the questions to that of the current user. As the current user progressively answers additional questions, the system progressively updates the matching and presentation of similar users. As such, as the current user navigates the website by answering polling questions, the selected answers are compared against the selected answers of other users to generate a likelihood of match between the user and each of the other users. The user profiles of other users that have a likelihood of match within a predetermined threshold are then presented to the current user.

To provide real-time polling and matching, the present invention includes a unique matching logic that enables the system to efficiently manage a large number of members/users. The system is provided in further detail below.

(4) DETAILS OF THE INVENTION

The present invention relates to a website and web accessible database, computer program product, computer implemented method, and data processing system that operate as a social networking website. In general and as depicted in FIG. 1, the present invention includes one or more processors that are specifically configured to operate as follows. At initiation, the processor(s) receives user information 100 from a user to generate a unique user profile for the user. After generating and/or saving the user profile, the user is provided a first polling question 102 that has a finite set of answers and a unique identification.

The user is provided the polling question via a computer or other networked device. Thus, the system includes members (i.e., users) that answer polls with a finite set of answers (for example, ten; however, any number of answers can be included). Each user can only provide one answer to one poll. Each poll answer has a unique ID within that poll, starting at 0 and going to N−1 where N is the number of answers.

In providing the finite set of answers, the user can select one of the answers via any suitable selection method as is commonly employed through computing systems, such as highlighting an answer, etc. Thereafter, the system receives and stores 104 a selected answer for the first polling question. The selected answer is then compared 106 against the selected answers of other users, based on the unique identification (i.e., for that same question), to generate a likelihood of match between the user and each of the other users. Finally, the user profiles of other users that have a likelihood of match within a predetermined threshold are displayed 108 to the user via a monitor or other display device. As a non-limiting example, the user profiles of the top-five users that most closely match the current user are presented to the current user.

To more closely match users with similarly minded users, the system cumulatively collects information regarding multiple polling questions. For example, the user is provided with a next polling question having a finite set of answers and a unique identification, with the system thereafter receiving and storing the selected answer. This process is repeated 110 for a plurality of next polling questions. Upon receipt of each answer, the selected answers for the user are cumulatively compared against all of the selected answers of all other users to generate the likelihood of match.

As can be appreciated by one skilled in the art, there are numerous techniques for determining a likelihood of match between two particular users, a non-limiting example of which includes a match percentage. To determine the match percentage between two particular users, the total number of polling questions as taken by the user and a selected other user is determined. Next, the number of same selected answers between the user and the selected other user is determined. Finally, the number of same selected answers can be divided by the total number of polling questions to generate the mach percentage between the two users.

In other words, after a member answers a poll, the member is matched to all other members based upon the poll they just answered and all other polls they have previously answered. Their answers are compared to all of the other answers of polls taken by all other users. A match percentage is formed and reported back to the user (e.g., in descending order). The match algorithm allows for a maximum and minimum percentage match as well as a maximum number of hits. As a non-limiting example, the application may request that the match server return the top 20 members with a 50% to 59% match.

Figure 2:
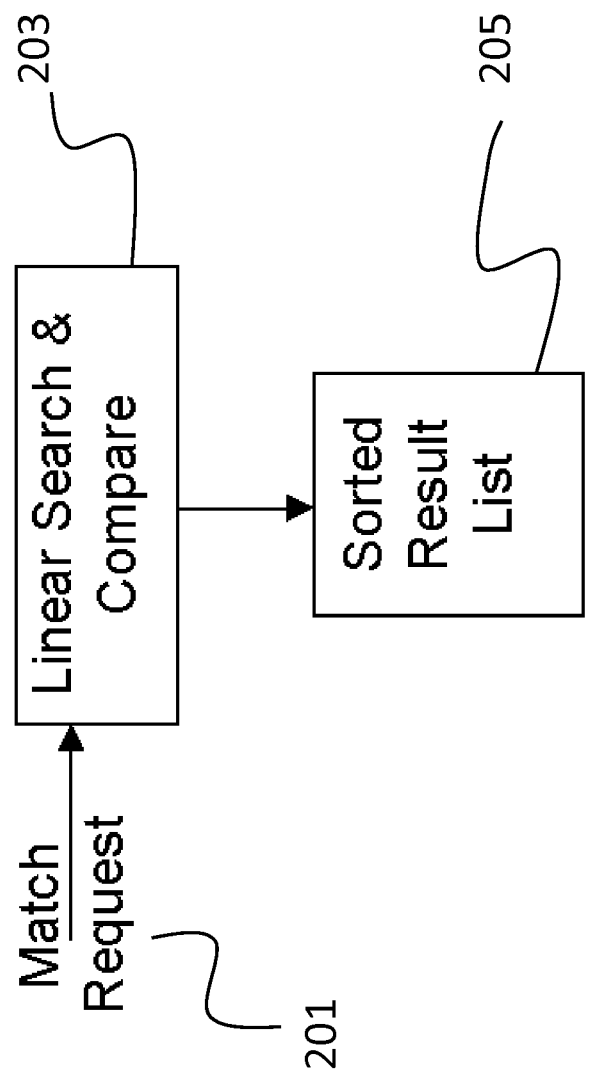
FIG. 2 is a flow chart depicting a general process according to the present invention.

The process by which the answers are stored and compared provides a unique function to the present invention that allows for nearly instant results. Generally speaking and as shown in FIG. 2, the system receives a match request 201, linearly searches and compares 203 a user selected answers against other users' answers, and provides a sorted result list 205 which is used display the most relevant matches.

Figure 3:
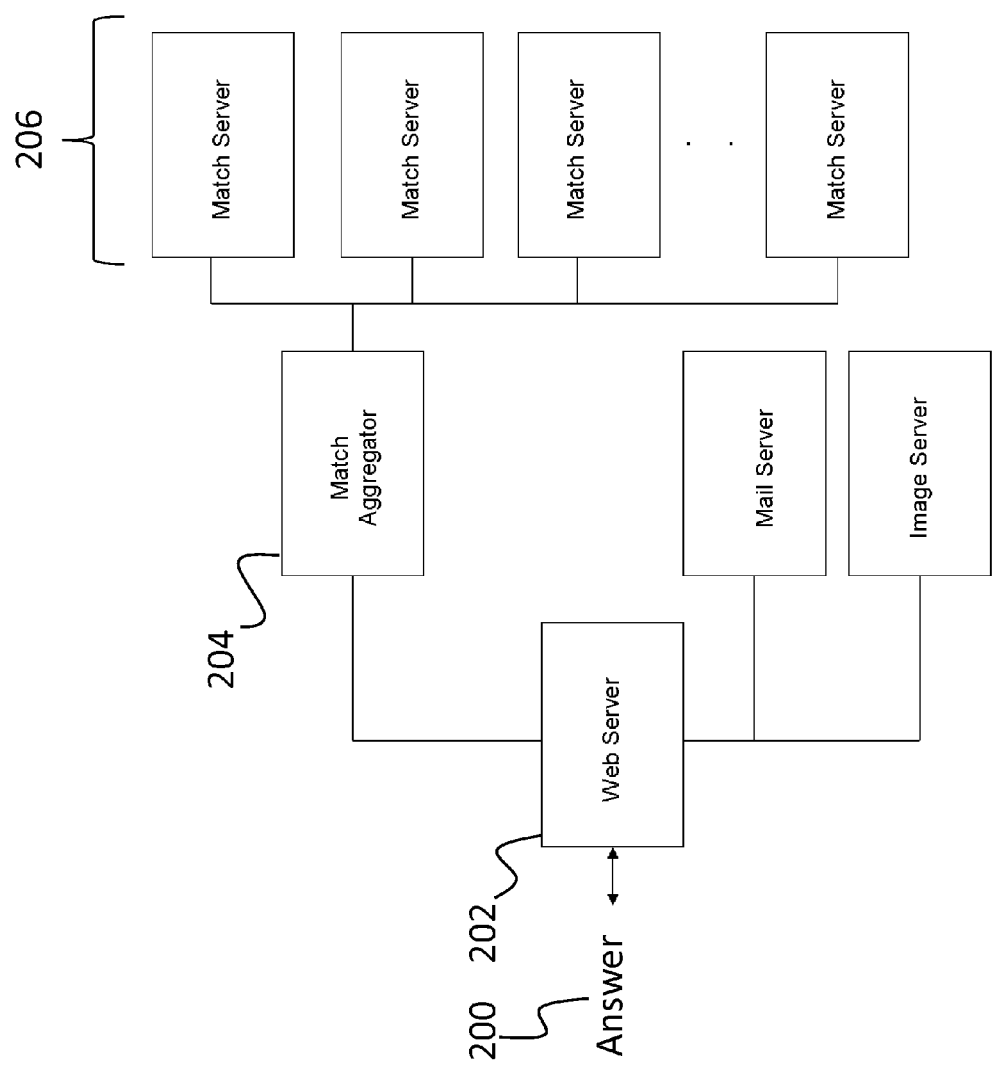
FIG. 3 is a flow chart depicting various components of the present invention.

As shown in FIG. 3, the selected answers 200 are collected with a web server 202 and stored in a database, a non-limiting example of which includes a MySQL database. The database can be stored in one form in memory and, in parallel, on disk. Upon receipt of a selected answer, the selected answer is separately transmitted from the web server 202, through a match aggregator 204, to a plurality of match servers 206. Thus, the poll answers are transmitted to each of the match servers 204 as polls are answered, over a TCP/IP socket connection. In this manner all match servers 204 are kept synchronized.

Each match server 206 is assigned a distinct subset of the other users, such that each match server 206 compares the selected answer 200 of the user against the selected answers of its distinct subset to generate a likelihood of match between the user and the users in its distinct subset.

Figure 4:
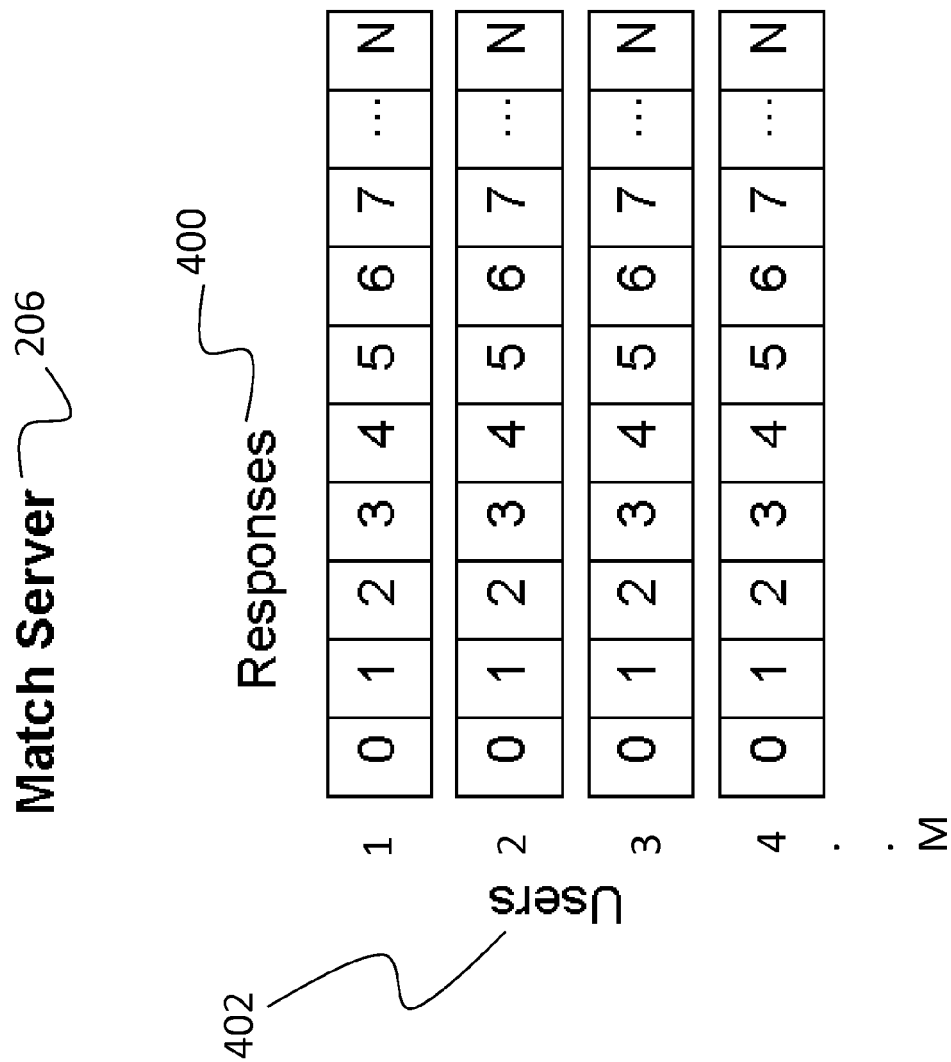
FIG. 4 is an illustration depicting an array as used by a match server of the present invention.

As shown in FIG. 4, in comparing the selected answer of the user against the selected answers of its distinct subset to generate a likelihood of match between the user and the users in its distinct subset, each match server 206 stores selected answers 400 N as an in memory, two-dimensional array, with n bytes per selected answer 400 N and m rows per user 402 M. N is the number of responses (answers) and M is the number of users, while n is the number of bytes per selected response and m is the number of rows per user. As can be appreciated by one skilled in the art, n and m are any real numbers. Although not limited thereto, the two-dimensional array desirably includes one byte per selected answer 400 N and one row per user 402 M. For example, if user 7 answers poll 5 with response 2, then the array row 7, byte 5 is set to 2. The response number 255 is reserved to indicate that the given poll has not yet been answered. As can be appreciated by one skilled in the art, the number 255 is arbitrary and is simply a marker for a non-answered question. This design allows for very rapid comparison and aggregation of result values even with a large number of polls and members. The in-memory, two-dimensional array provides for linear speed across all match servers and an almost immediate comparison to determine if a particular user had a same answer to that of another user with respect to a particular polling question. Thus, each match server can quickly generate a likelihood of match between the user and the subset of users (distinct subsets).

Figure 5:
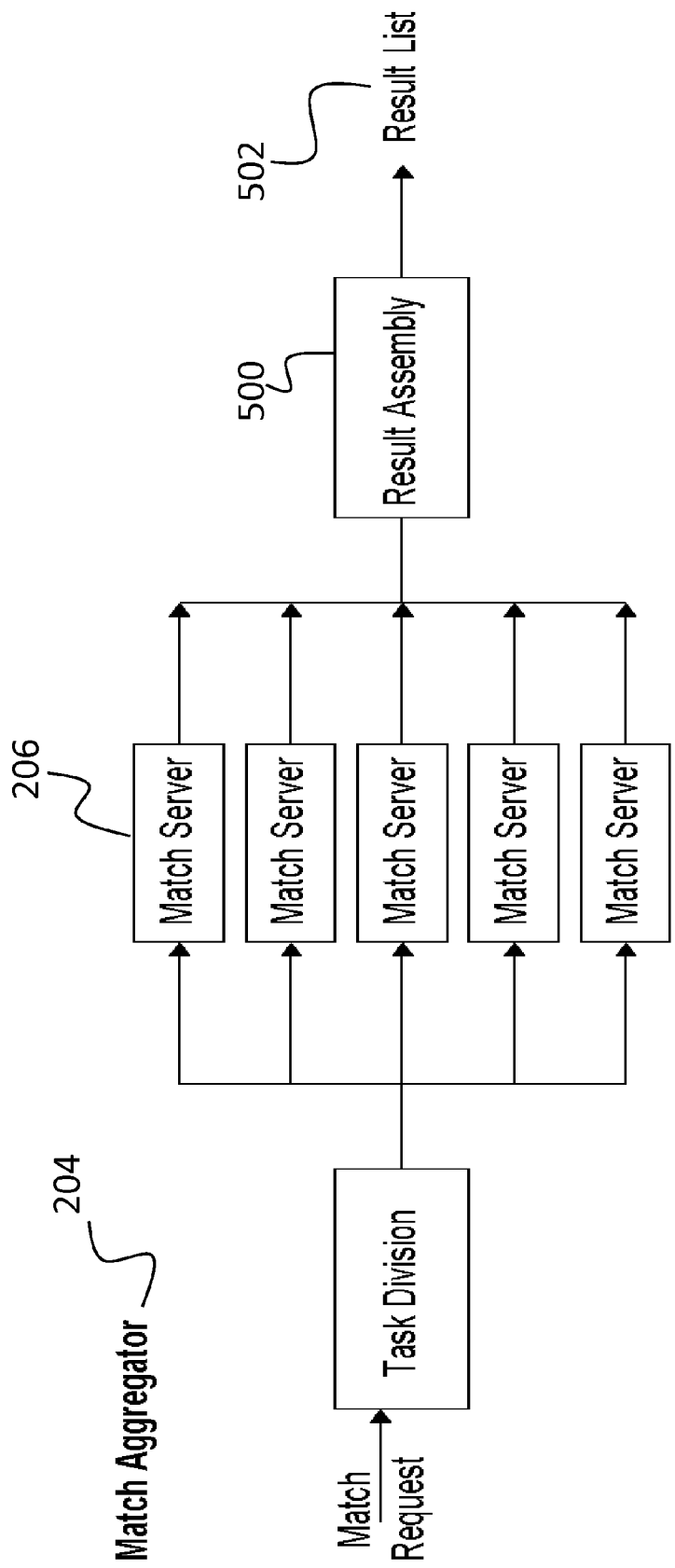
FIG. 5 is a flow chart depicting a process as implemented by a match aggregator according to the present invention.

Thereafter and as shown in FIG. 5, the match aggregator 204 receives from each match server 206 a likelihood of match between the user and its distinct subset (i.e., the likelihood of matches between the user and each of the other users in each distinct subset). In a result assembly 500, the match aggregator 204 then compiles the likelihood of matches from the plurality of match servers 206 to generate the likelihood of match between the user and each of the other users (which provides real time updates of the distributed match servers 206). The results are then organized into a result list 502 (e.g., ascending or descending order) which is then transmitted to the web server (i.e., element 202 in FIG. 3) for further processing. The web server 202 then displays to the user profiles other users that are most similar or otherwise fall within the predetermined threshold.

The system consists of multiple servers which can reside on the same or different physical machines. Each server is aware of the other servers by settings in a database. At startup, the servers load their base information from the database. Each match server is assigned a range of member IDs and only deals with matching those members. The match aggregator server farms out the match requests and re-aggregates them as the results arrive. The match aggregator is responsible for transmitting the member poll answer information to each server and then waiting for all results to be received, sorting those results and transmitting them back to the web server. By using a "divide and conquer" design, the system can scale to a nearly unlimited number of members and polls. Due to Ethernet bandwidth limitations, a practical limit is about 1,000,000 polls answered per member; however it would take a person about 2 years to answer 1,000,000 polls if they answered one poll a minute 24 hours a day seven days a week.

Figure 6:
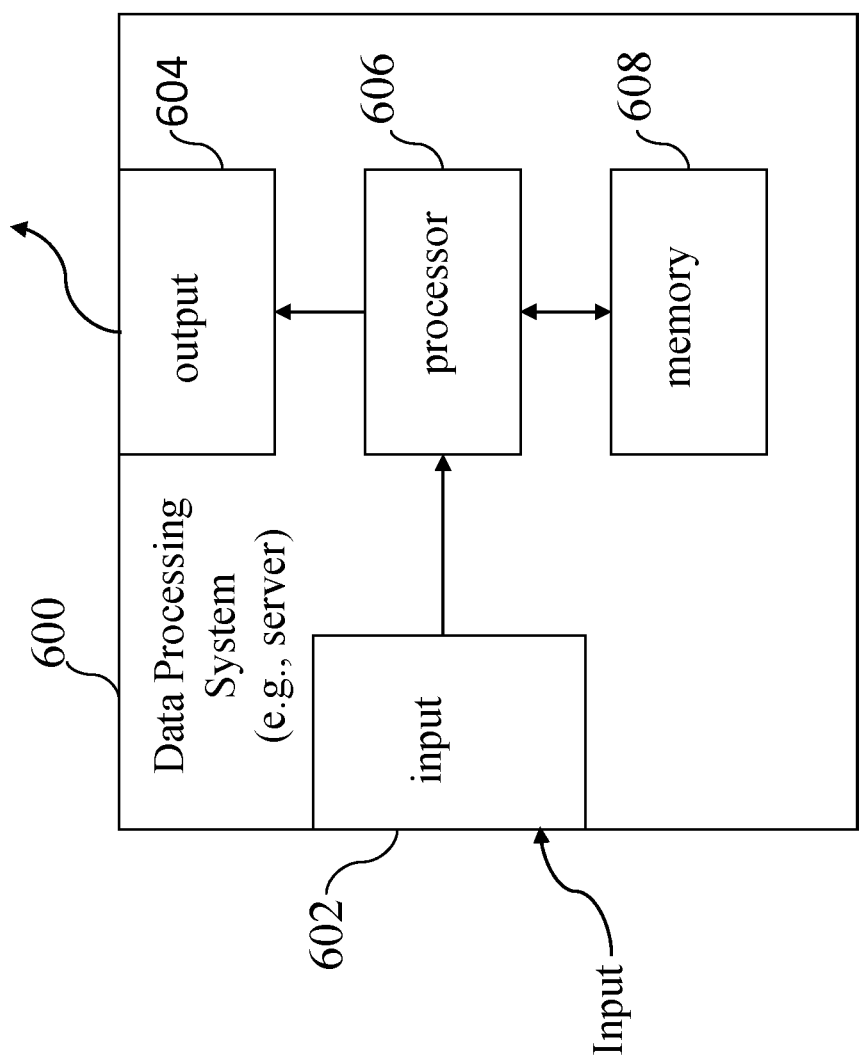
FIG. 6 is a block diagram depicting the components of a data processing system of the present invention.

A block diagram depicting the components of a poll-based networking system (or server) of the present invention is provided in FIG. 6. Each server 600 comprises an input 602 for receiving information from a user (e.g., a polling answer, etc.). Note that the input 602 may include multiple "ports." Typically, input is received from a user or other servers. An output 604 is connected with the processor for providing user/match/answer information to other systems in order that a network of computer systems may serve as a poll-based networking system. Output may also be provided to other devices or other programs; e.g., to other software modules, for use therein. The input 602 and the output 604 are both coupled with a processor 606 (or processors), which may be a general-purpose computer processor or a specialized processor designed specifically for use with the present invention. The processor(s) 606 is coupled with a memory 608 to permit storage of data and software that are to be manipulated by commands to the processor 606.

Figure 7:
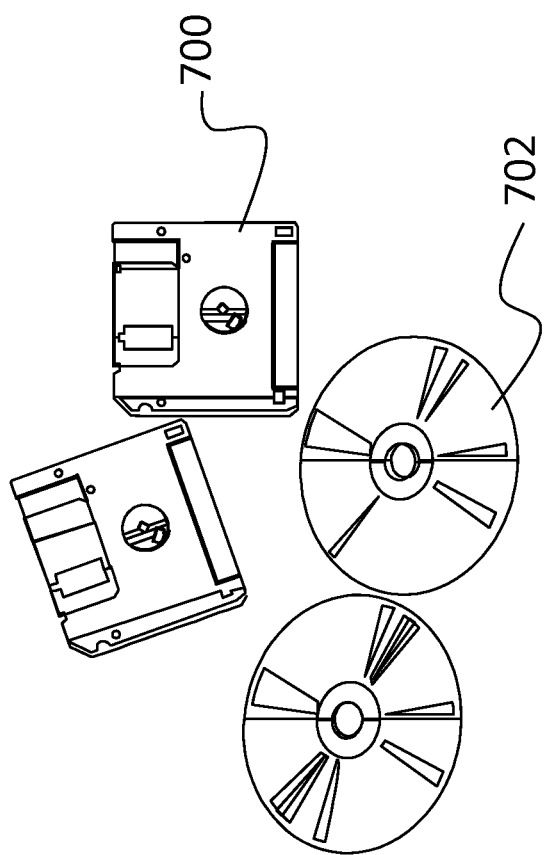
FIG. 7 is an illustration of a computer program product embodying the present invention.

An illustrative diagram of a computer program product embodying the present invention is depicted in FIG. 7. The computer program product is depicted as a floppy disk 700 or an optical disk 702 such as a CD or DVD. However, as mentioned previously, the computer program product generally represents computer-readable instructions stored on any compatible non-transitory computer-readable medium.

Figure 8A:
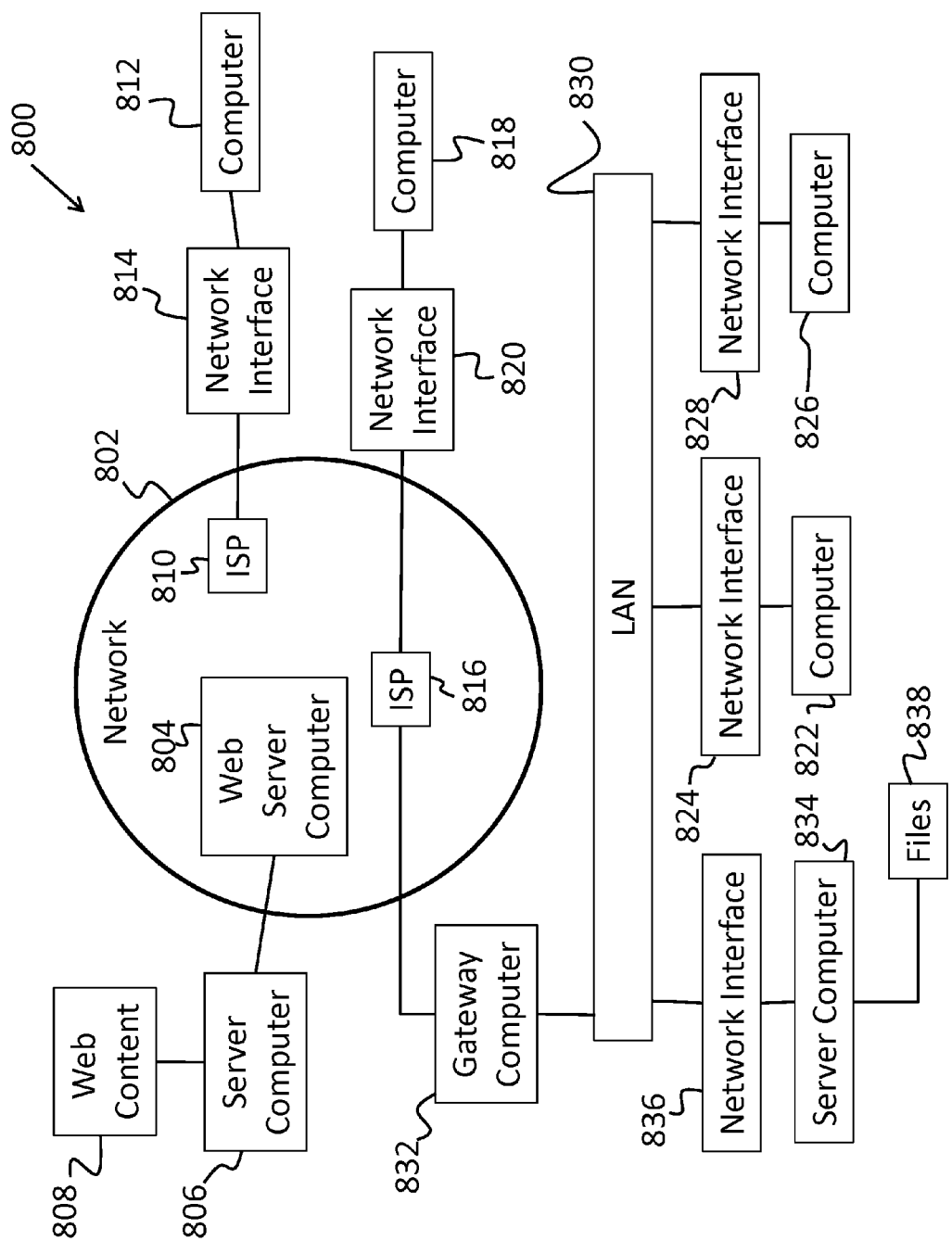
FIG. 8A is a conceptual view of a system on which one or more of the described aspects may be implemented.
Figure 8B:
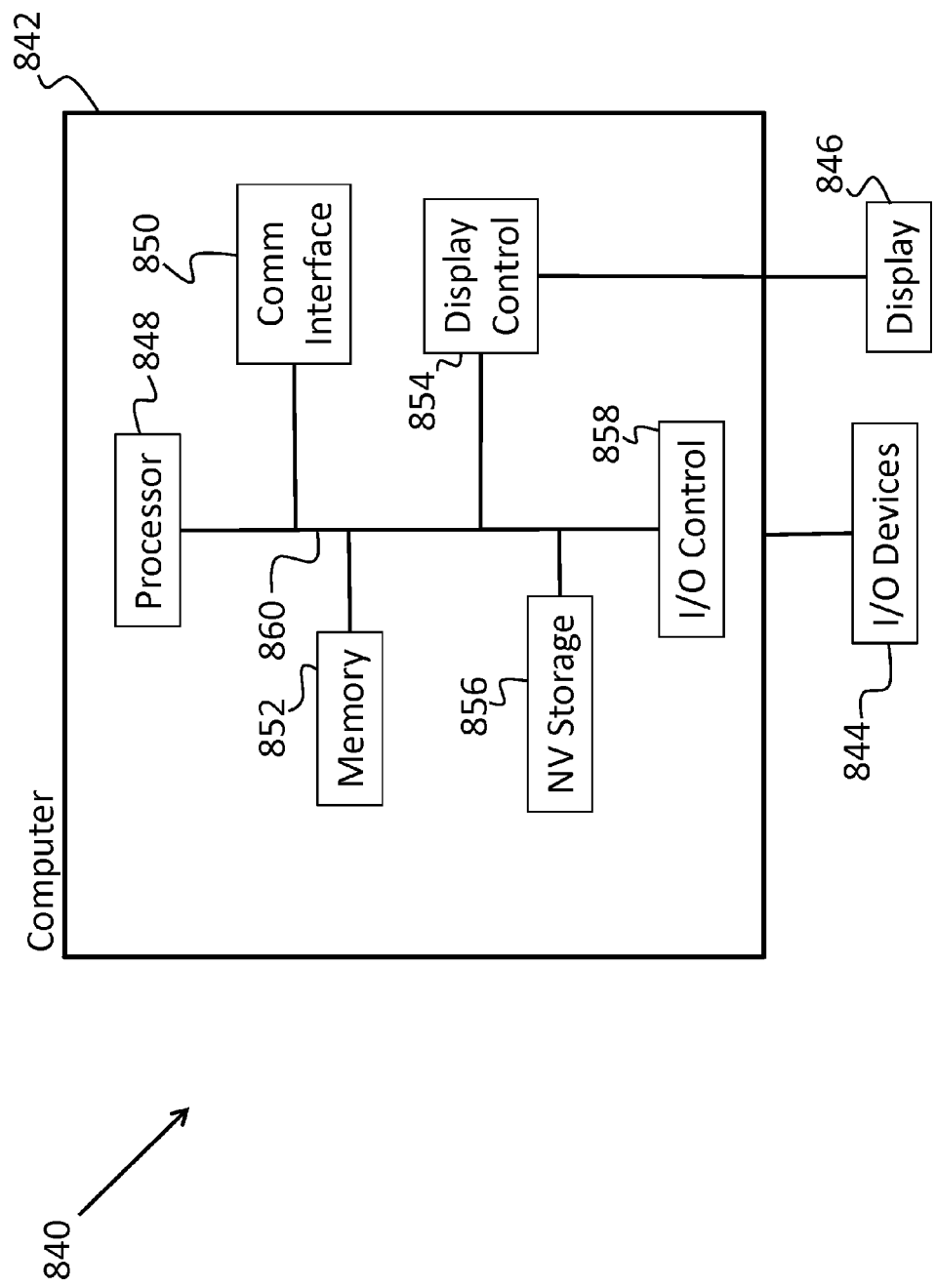
FIG. 8B is a conceptual view of a system according to the present invention.

FIGS. 8A and 8B depict a conceptual view of a system on which, by way of example but not limitation, one or more of the described embodiments may be implemented. The following description of FIGS. 8A and 8B is intended to provide an overview of computer hardware and other operating components suitable for performing the methods of embodiments described herein, but is not intended to limit the applicable environments. Similarly, the computer hardware and other operating components may be suitable as part of the apparatuses of embodiments described herein. Other embodiments can be practiced with other computer system configurations, including hand-held devices, multiprocessor systems, microprocessor-based or programmable consumer electronics, network PCs, minicomputers, mainframe computers, and the like. Other embodiments can also be practiced in distributed computing environments where tasks are performed by remote processing devices that are linked through a communications network.

FIG. 8A depicts a networked system 800 that includes several computer systems coupled together through a network 802, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server computer 804 (also depicted as element 202 in FIG. 3) is typically at least one computer system which operates as a server computer system and is configured to operate with the protocols of the World Wide Web and is coupled to the Internet. The web server computer 804 can be a conventional server computer system. Optionally, the web server computer 804 can be part of an ISP which provides access to the Internet for member systems. The web server computer 804 is shown coupled to the server computer 806 which itself is coupled to web content 808, which can be considered a form of a media database. While two computers 804 and 806 are shown in FIG. 8A, the web server computer 804 and the server computer 806 can be one computer system having different software components providing the web server functionality and the server functionality provided by the server computer 806, which will be described further below. Further, the web server computer 804 can be inclusive of the match aggregator and/or match server or connected with the match aggregator, etc., as depicted in FIG. 3.

Access to the network 802 is typically provided by Internet service providers (ISPs), such as the ISPs 810 and 816. Users on member systems, such as member computer systems 812, 818, 822, and 826 obtain access to the Internet through the ISPs 810 and 816. Access to the Internet allows users of the member computer systems to exchange information, receive and send e-mails, and view documents, such as documents which have been prepared in the HTML format. These documents are often provided by web servers, such as web server 804, which are referred to as being "on" the Internet. Often these web servers are provided by the ISPs, such as ISP 810, although a computer system can be set up and connected to the Internet without that system also being an ISP.

Member computer systems 812, 818, 822, and 826 can each, with the appropriate web browsing software, view HTML pages provided by the web server 804. The ISP 810 provides Internet connectivity to the member computer system 812 through the network interface 814 (e.g., modem, T1, cable, wireless, etc.), which can be considered part of the member computer system 812. The member computer system can be a personal computer system, a network computer, a web TV system, or other computer system. While FIG. 8A shows the network interface 814 generically as a "modem," the interface can be an analog modem, ISDN modem, cable modem, satellite transmission interface (e.g. "direct PC"), wireless, T1, or any other interface for coupling a computer system to other computer systems.

Similar to the ISP 814, the ISP 816 provides Internet connectivity for member systems 818, 822, and 826, although as shown in FIG. 8A, the connections are not the same for these three computer systems. Member computer system 818 is coupled through a network interface 820 while member computer systems 822 and 826 are part of a LAN 830.

Member computer systems 822 and 826 are coupled to the LAN 830 through network interfaces 824 and 828, which can be Ethernet network or other network interfaces. The LAN 830 is also coupled to a gateway computer system 832 which can provide firewall and other Internet-related services for the local area network. This gateway computer system 832 is coupled to the ISP 816 to provide Internet connectivity to the member computer systems 822 and 826. The gateway computer system 832 can be a conventional server computer system.

Alternatively, a server computer system 834 can be directly coupled to the LAN 830 through a network interface 836 to provide files 838 and other services to the members 822 and 826, without the need to connect to the Internet through the gateway system 832.

FIG. 8B depicts another example of a computer system 840 for use in the system 800 (FIG. 8A). The computer system 840 may be a conventional computer system that can be used as a member computer system or a server computer system or as a web server computer system. Such a computer system can be used to perform many of the functions of an Internet service provider, such as ISP 810 (FIG. 8A). The computer system 840 includes a computer 842, I/O devices 844, and a display device 846. The computer 842 includes a processor 848, a communications interface 850, memory 852, display controller 854, non-volatile storage 856, and I/O controller 858. The computer system 840 may be couple to or include the I/O devices 844 and display device 846.

The computer 842 interfaces to external systems through the communications interface 850, which may include a modem or network interface. It will be appreciated that the communications interface 850 can be considered to be part of the computer system 840 or a part of the computer 842. The communications interface can be an analog modem, isdn modem, cable modem, token ring interface, satellite transmission interface (e.g. "direct PC"), or other interfaces for coupling a computer system to other computer systems.

The processor 848 may be, for example, a conventional microprocessor such as an Intel Pentium microprocessor or Motorola power PC microprocessor. The memory 852 is coupled to the processor 848 by a bus 860. The memory 852 can be dynamic random access memory (DRAM) and can also include static ram (SRAM). The bus 860 couples the processor 848 to the memory 852, also to the non-volatile storage 856, to the display controller 854, and to the I/O controller 858.

The I/O devices 844 can include a keyboard, disk drives, printers, a scanner, and other input and output devices, including a mouse or other pointing device. The display controller 854 may control in the conventional manner a display on the display device 846, which can be, for example, a cathode ray tube (CRT) or liquid crystal display (LCD). The display controller 854 and the I/O controller 858 can be implemented with conventional well known technology.

The non-volatile storage 856 is often a magnetic hard disk, an optical disk, or another form of storage for large amounts of data. Some of this data is often written, by a direct memory access process, into memory 852 during execution of software in the computer 842. One of skill in the art will immediately recognize that the terms "machine-readable medium" or "computer-readable medium" includes any type of storage device that is accessible by the processor 848 and also encompasses a carrier wave that encodes a data signal.

The computer system 840 is one example of many possible computer systems which have different architectures. For example, personal computers based on an Intel microprocessor often have multiple buses, one of which can be an I/O bus for the peripherals and one that directly connects the processor 848 and the memory 852 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 852 for execution by the processor 848. A Web TV system, which is known in the art, is also considered to be a computer system according to the present invention, but it may lack some of the features shown in FIG. 8B, such as certain input or output devices. A typical computer system will usually include at least a processor, memory, and a bus coupling the memory to the processor.

In addition, the computer system 840 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 856 and causes the processor 848 to execute the various acts required by the operating system to input and output data and to store data in memory, including storing files on the non-volatile storage 856.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instruction means, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description provided herein. In addition, the present invention is not described with reference to any particular programming language, and various embodiments may thus be implemented using a variety of programming languages.

While a number of exemplary aspects and embodiments have been discussed above, those of skill in the art will recognize certain modifications, permutations, additions, and sub-combinations thereof. It is therefore intended that any claims hereafter introduced based upon these descriptions and drawings are interpreted to include all such modifications, permutations, additions, and sub-combinations as are within their true spirit and scope.

(5) CONCLUSION

In summary, the present invention improves upon the prior art by providing a poll-based networking system that provides users with a series of polling questions and matches the user with other users that similarly answered the polling questions. In operation, the system uses a distributed architecture of match servers and a match aggregator. An in-memory array is used for comparing poll answers and aggregating results in real time, which provides for real-time updates of the distributed servers. Through the in-memory array, the system displays to the user, in real-time, other matched users based upon all of the polls taken.

What is claimed is:

1. A poll-based networking system, comprising:
   a data processing system having one or more processors and a memory, the memory being specifically encoded with instructions such that when executed, the instructions cause the one or more processors to perform operations of:
   receiving user information from a user to generate a unique user profile for the user;
   providing the user a first polling question, the first polling question having a finite set of answers and a unique identification;
   receiving and storing a selected answer for the first polling question;
   comparing the selected answer against the selected answers of other users, based on the unique identification, to generate a likelihood of match between the user and each of the other users; and
   displaying to the user the user profiles of other users that have a likelihood of match within a predetermined threshold.

2. The poll-based networking system as set forth in claim 1, wherein the one or more processors are further configured to perform operations of:
   providing the user with a next polling question, the next polling question having a finite set of answers and a unique identification;
   receiving and storing a selected answer for the next polling question;
   cumulatively comparing the selected answer for the first polling question and the next polling question against the selected answers of other users to generate a likelihood of match between the user and each of the other users;
   displaying to the user the user profiles of other users that have a likelihood of match within a predetermined threshold; and
   repeating the process for a plurality of next polling questions.

3. The poll-based networking system as set forth in claim 2, wherein in cumulatively comparing, the one or more processors are further configured to perform operations of:
   matching the user to other users based upon all of the selected answers by the user and all of the selected answers by the other users, such that all of the selected answers by the user are compared to all of the selected answers of all of the other users; and
   generating a likelihood of match between the user and each of the other users as a match percentage.

4. The poll-based networking system as set forth in claim 3, wherein in generating a likelihood of match between the user and each of the other users as a match percentage, the one or more processors are further configured to perform operations of:

determining a total number of polling questions as taken by the user and a selected other user;

determining a number of same selected answers between the user and the selected other user; and dividing the number of same selected answers by the total number of polling questions to generate the match percentage between the user and the selected other user.

5. The poll-based networking system as set forth in claim 4, wherein the one or more processors is further configured to perform operations of:

receiving match commands to identify users that fall within a maximum and minimum match percentage between the user and other users; and displaying to the user a maximum number of members that fall within the maximum and minimum match percentage.

6. The poll-based networking system as set forth in claim 5, wherein the one or more processors is further configured to perform operations of:

collecting the selected answers with a web server and storing the selected answers in a database;

upon receipt of a selected answer, separately transmitting the selected answer from the web server, through a match aggregator, to a plurality of match servers, each match server being assigned a distinct subset of the other users, such that each match server compares the selected answer of the user against the selected answers of the users in its distinct subset to generate a likelihood of match between the user and each of the users in its distinct subset;

receiving in the match aggregator, from each match server, a likelihood, of match between the user and the users in the distinct subset;

compiling the likelihood of matches from the plurality of match servers to generate the likelihood of match between the user and each of the other users; and transmitting the likelihood of match between the user and each of the other users to the web server for further processing.

7. The poll-based networking system as set forth in claim 6, wherein in comparing the selected answer of the user against the selected answers of the users in its distinct subset to generate a likelihood of match between the user and the users in its distinct subset, each match server is further configured to store selected answers as an in memory, two-dimensional array, with n bytes per selected answer and m rows per user.

8. The poll-based networking system as set forth in claim 1, wherein the one or more processors is further configured to perform operations of:

collecting the selected answers with a web server and storing the selected answers in a database;

upon receipt of a selected answer, separately transmitting the selected answer from the web server, through a match aggregator, to a plurality of match servers, each match server being assigned a distinct subset of the other users, such that each match server compares the selected answer of the user against the selected answers of the users in its distinct subset to generate a likelihood of match between the user and each of the users in its distinct subset;

receiving in the match aggregator, from each match server, a likelihood of match between the user and the users in the distinct subset;

compiling the likelihood of matches from the plurality of match servers to generate the likelihood of match between the user and each of the other users; and transmitting the likelihood of match between the user and each of the other users to the web server for further processing.

9. The poll-based networking system as set forth in claim 8, wherein in comparing the selected answer of the user against the selected answers of the users in its distinct subset to generate a likelihood of match between the user and the users in its distinct subset, each match server is further configured to store selected answers as an in memory, two-dimensional array, with n bytes per selected answer and m rows per user.

10. A computer-implemented method for creating a poll-based network, the method comprising an act of causing a computer having one or more processors and a memory specifically encoded with computer executable instruction means to execute the instruction means to cause the one or more processors to perform operations of:

receiving user information from a user to generate a unique user profile for the user;

providing the user a first polling question, the first polling question having a finite set of answers and a unique identification;

receiving and storing a selected answer for the first polling question;

comparing the selected answer against the selected answers of other users, based on the unique identification, to generate a likelihood of match between the user and each of the other users; and displaying to the user the user profiles of other users that have a likelihood of match within a predetermined threshold.

11. The computer implemented method as set forth in claim 10, further comprising operations of:

providing the user with a next polling question, the next polling question having a finite set of answers and a unique identification;

receiving and storing a selected answer for the next polling question;

cumulatively comparing the selected answer for the first polling question and the next polling question against the selected answers of other users to generate a likelihood of match between the user and each of the other users;

displaying to the user the user profiles of other users that have a likelihood of match within a predetermined threshold; and repeating the process for a plurality of next polling questions.

12. The computer implemented method as set forth in claim 11, wherein, in cumulatively comparing, further comprising an act of causing the one or more processors to perform operations of:

matching the user to other users based upon all of the selected answers by the user and all of the selected answers by the other users, such that all of the selected answers by the user are compared to all of the selected answers of all of the other users; and generating a likelihood of match between the user and each of the other users as a match percentage.

13. The computer implemented method as set forth in claim 12, wherein in generating a likelihood of match between the user and each of the other users as a match percentage, further comprising an act of causing the one or more processors to perform operations of:

determining a total number of polling questions as taken by the user and a selected other user;

determining a number of same selected answers between the user and the selected other user; and dividing the number of same selected answers by the total number of polling questions to generate the match percentage between the user and the selected other user.

14. The computer implemented method as set forth in claim 13, further comprising an act of causing the one or more processors to perform operations of:
receiving match commands to identify users that fall within a maximum and minimum match percentage between the user and other users; and
displaying to the user a maximum number of members that fall within the maximum and minimum match percentage.

15. The computer implemented method as set forth in claim 14, further comprising an act of causing the one or more processors to perform operations of:
collecting the selected answers with a web server and storing the selected answers in a database;
upon receipt of a selected answer, separately transmitting the selected answer from the web server, through a match aggregator, to a plurality of match servers, each match server being assigned a distinct subset of the other users, such that each match server compares the selected answer of the user against the selected answers of the users in its distinct subset to generate a likelihood of match between the user and each of the users in its distinct subset;
receiving in the match aggregator, from each match server, a likelihood of match between the user and the users in the distinct subset;
compiling the likelihood of matches from the plurality of match servers to generate the likelihood of match between the user and each of the other users; and
transmitting the likelihood of match between the user and each of the other users to the web server for further processing.

16. The computer implemented method as set forth in claim 15, wherein in comparing the selected answer of the user against the selected answers of the users in its distinct subset to generate a likelihood of match between the user and the users in its distinct subset, each match server is further configured to store selected, answers as an in memory, two-dimensional array, with n bytes per selected answer and m rows per user.

17. The computer implemented method as set forth in claim 10, further comprising an act of causing the one or more processors to perform operations of:
collecting the selected answers with a web server and storing the selected answers in a database;
upon receipt of a selected answer, separately transmitting the selected answer from the web server, through a match aggregator, to a plurality of match servers, each match server being assigned a distinct subset of the other users, such that each match server compares the selected answer of the user against the selected answers of the users in its distinct subset to generate a likelihood of match between the user and each of the users in its distinct subset;
receiving in the match aggregator, from each match server, a likelihood of match between the user and the users in the distinct subset;
compiling the likelihood of matches from the plurality of match servers to generate the likelihood of match between the user and each of the other users; and
transmitting the likelihood of match between the user and each of the other users to the web server for further processing.

18. The computer implemented method as set forth in claim 17, wherein in comparing the selected answer of the user against the selected answers of the users in its distinct subset to generate a likelihood of match between the user and the users in its distinct subset, each match server is further configured to store selected answers as an in memory, two-dimensional array, with n bytes per selected answer and m rows per user.

19. A computer program product for creating a poll-based network, the computer program product comprising computer-readable instruction means stored on a non-transitory computer-readable medium that are executable by a computer for causing the computer to perform operations of:
receiving user information from a user to generate a unique user profile for the user;
providing the user a first polling question, the first polling question having a finite set of answers and a unique identification;
receiving and storing a selected answer for the first polling question;
comparing the selected answer against the selected answers of other users, based on the unique identification, to generate a likelihood of match between the user and each of the other users; and
displaying to the user the user profiles of other users that have a likelihood of match within a predetermined threshold.

20. The computer program product as set forth in claim 19, further comprising instruction means for causing the computer to perform operations of:
providing the user with a next polling question, the next polling question having a finite set of answers and a unique identification;
receiving and storing a selected answer for the next polling question;
cumulatively comparing the selected answer for the first polling question and the net polling question against the selected answers of other users to generate a likelihood of match between the user and each of the other users;
displaying to the user the user profiles of other users that have a likelihood of match within a predetermined threshold; and
repeating the process for a plurality of next polling questions.

21. The computer program product as set forth in claim 20, further comprising instruction means for causing the computer to perform operations of:
matching the user to other users based upon all of the selected answers by the user and all of the selected answers by the other users, such that all of the selected answers by the user are compared to all of the selected answers of all of the other users; and
generating a likelihood of match between the user and each of the other users as a match percentage.

22. The computer program product as set forth in claim 21, further comprising instruction means for causing the computer to perform operations of:
determining a total number of polling questions as taken by the user and a selected other user;
determining a number of same selected answers between the user and the selected other user; and
dividing the number of same selected answers by the total number of polling questions to generate the match percentage between the user and the selected other user.

23. The computer program product as set forth in claim 22, further comprising instruction means for causing the computer to perform operations of:

receiving match commands to identify users that fall within a maximum and minimum match percentage between the user and other users; and displaying to the user a maximum number of members that fall within the maximum and minimum match percentage.

24. The computer program product as set forth in claim 23, further comprising instruction means for causing the computer to perform operations of:

collecting the selected answers with a web server and storing the selected answers in a database;

upon receipt of a selected answer, separately transmitting the selected answer from the web server, through a match aggregator, to a plurality of match servers, each match server being assigned a distinct subset of the other users, such that each match server compares the selected answer of the user against the selected answers of the users in its distinct subset to generate a likelihood of match between the user and each of the users in its distinct subset;

receiving in the match aggregator, from each match server, a likelihood of match between the user and the users in the distinct subset;

compiling the likelihood of matches from the plurality of match servers to generate the likelihood of match between the user and each of the other users; and transmitting the likelihood of match between the user and each of the other users to the web server for further processing.

25. The computer program product as set forth in claim 24, wherein in comparing the selected answer of the user against the selected answers of the users in its distinct subset to generate a likelihood of match between the user and the users in its distinct subset, each match server is further configured to store selected answers as an in memory, two-dimensional array, with n bytes per selected answer and m rows per user.

26. The computer program product as set forth in claim 19, further comprising instruction means for causing the computer to perform operations of:

collecting the selected answers with a web server and storing the selected answers in a database;

upon receipt of a selected answer, separately transmitting the selected answer from the web server, through a match aggregator, to a plurality of match servers, each match server being assigned a distinct subset of the other users, such that each match server compares the selected answer of the user against the selected answers of the users in its distinct subset to generate a likelihood of match between the user and each of the users in its distinct subset;

receiving in the match aggregator, from each match server, a likelihood of match between the user and the users in the distinct subset;

compiling the likelihood of matches from the plurality of match servers to generate the likelihood of match between the user and each of the other users; and transmitting the likelihood of match between the user and each of the other users to the web server for further processing.

27. The computer program product as set forth in claim 26, wherein in comparing the selected answer of the user against the selected answers of the users in its distinct subset to generate a likelihood of match between the user and the users in its distinct subset, each match server is further configured to store selected answers as an in memory, two-dimensional array, with n bytes per selected answer and m rows per user.

* * * * *